United States Patent

Gonzalez-Blanco et al.

[11] Patent Number: 6,110,266
[45] Date of Patent: Aug. 29, 2000

[54] INK-JET INKS CONTAINING NANOMETER-SIZE INORGANIC PIGMENTS

[75] Inventors: Juan Gonzalez-Blanco; Werner Hoheisel, both of Köln; Peter Roger Nyssen, Dormagen; Dirk Pfützenreuter, Burscheid, all of Germany

[73] Assignee: Bayer Aktiengesellschaft, Leverkusen, Germany

[21] Appl. No.: 09/181,732

[22] Filed: Oct. 28, 1998

[30] Foreign Application Priority Data

Nov. 6, 1997 [DE] Germany .......................... 197 49 082

[51] Int. Cl.[7] .......................... C09D 11/02; C04B 14/04; C04B 14/34; C08K 3/10; C08K 3/14
[52] U.S. Cl. ..................................... 106/31.65; 106/31.89; 106/31.9; 106/403; 106/436; 106/447; 106/450; 106/481
[58] Field of Search .............................. 106/31.65, 31.89, 106/31.9, 403, 436, 447, 450, 481

[56] References Cited

U.S. PATENT DOCUMENTS

| | | | |
|---|---|---|---|
| 4,524,131 | 6/1985 | Himmelmann et al. | 430/523 |
| 4,963,189 | 10/1990 | Hindagolla | 106/22 |
| 5,472,477 | 12/1995 | König | 75/343 |
| 5,519,085 | 5/1996 | Ma et al. | 106/31.65 |
| 5,538,548 | 7/1996 | Yamazaki | 106/31.65 |
| 5,538,549 | 7/1996 | Kato et al. | 106/31.65 |
| 5,590,387 | 12/1996 | Schmidt et al. | 419/36 |
| 5,716,435 | 2/1998 | Aida et al. | 106/31.65 |
| 5,731,138 | 3/1998 | Helling et al. | 430/551 |
| 5,810,266 | 9/1998 | Nyssen et al. | 241/5 |
| 5,837,041 | 11/1998 | Bean et al. | 106/31.65 |
| 5,925,178 | 7/1999 | Martin et al. | 106/31.65 |

FOREIGN PATENT DOCUMENTS

| | | |
|---|---|---|
| 0 356 980 | 5/1992 | European Pat. Off. . |
| 0 518 225 | 12/1992 | European Pat. Off. . |
| 0 556 649 | 8/1993 | European Pat. Off. . |
| 0 622 429 | 11/1994 | European Pat. Off. . |
| 0 823 464 | 2/1998 | European Pat. Off. . |
| 62/179579 | 8/1987 | Japan . |

*Primary Examiner*—Helene Klemanski
*Attorney, Agent, or Firm*—Joseph C. Gil; Richard E. L. Henderson

[57] ABSTRACT

The present invention relates to pigment preparations containing (a) at least one pigment having an average primary particle size of 0.1 to 50 nm selected from the group consisting of carbides, nitrides, borides, and silicides of the elements Ti, Zr, Hf, Si, Ge, and Sn, (b) at least one dispersant having a weight average molecular weight ($M_w$) greater than 1000, and (c) water.

The invention further relates to the use of such pigment preparations in inks for ink-jet printing.

15 Claims, No Drawings

INK-JET INKS CONTAINING NANOMETER-SIZE INORGANIC PIGMENTS

BACKGROUND OF THE INVENTION

The invention relates to pigment preparations containing nanometer-size inorganic pigments, processes for their preparation, and their use as ink for ink-jet printing.

The colorants used for ink-jet printing include both water-soluble dyestuffs and organic coloring pigments and carbon blacks. In general, organic dyestuffs produce strong prints of high brilliance but often exhibit poorer lightfastness compared with coloring pigments. Organic pigments often have the disadvantage of showing a lack in brilliance and/or transparency, and their lightfastness is still insufficient for a variety of applications, for example, for outside applications. Especially in the area of black ink-jet colorants, both organic dyestuffs and inorganic coloring pigments and carbon blacks do not yet meet the desired properties in terms of high optical density and lightfastness.

Thus, for example, Japanese Patent 62/179,579 describes pigment preparations containing titanium nitride in which the TiN used, as disclosed by the manufacturer, has an average particle diameter greater than 0.7 μm.

The object of the present invention is to provide aqueous pigment preparations for use as ink-jet inks which can be used for producing prints having improved lightfastness while exhibiting high optical density.

SUMMARY OF THE INVENTION

The invention relates to pigment preparations comprising
(a) at least one pigment having an average primary particle size of 0.1 to 50 nm selected from the group consisting of carbides, nitrides, borides, and silicides of the elements Ti, Zr, Hf, Si, Ge, and Sn,
(b) at least one dispersant having a weight average molecular weight ($M_w$) greater than 1000 (preferably 1000 to 500,000), and
(c) water.

DETAILED DESCRIPTION OF THE INVENTION

Pigment

The average primary particle size of the pigments, which can be determined by electron micrographs, is preferably 0.5 to 50 nm (more preferably 0.5 to 30 nm.). Preferably, the primary particles of the pigments have a spherical structure. They may also be present in the form of their agglomerates or aggregates having an average particle size of less than 500 nm (preferably less than 150 nm).

The pigments to be used may be crystalline or amorphous but are preferably crystalline.

Particularly preferred pigments are ZrN (purple), TiN (blue-black), TiC (brown-black), and SiC (yellow-orange).

The nanometer-size pigments can be obtained, for example, by the methods described in European Patent Application 650,945 and U.S. Pat. No. 5,472,477. The preferred method used is the chemical vapor reaction ("CVR") method, which allows particles having a very narrow size distribution to be obtained free of oversize particles and in high purity.

The characteristic feature of the pigments thus prepared, preferably in powder form, is the complete absence of primary particles substantially larger than the average particle size. Thus, the powders contain less than 1% of primary particles deviating more than 20% from the average particle size, with primary particles deviating more than 50% being virtually absent.

The pigments (a) used in the pigment preparations according to the invention can be present either in the form of their primary particles or as agglomerates or aggregates of primary particles or as a mixture of both. Agglomerates or aggregates are understood to mean particles in which a plurality of primary particles interact with one another through van-der-Waals forces or in which the primary particles have become attached to one another during the preparation process by means of a surface reaction or by "sintering".

The oxygen contents of the pigments used can be extremely small and amount to less than 10% by weight (preferably less than 1% by weight, more preferably less than 0.1% by weight) relative to the solid. Another characteristic feature is their high purity and high surface purity. As a result of the preparative process, the pigments to be used may be very air-sensitive or even pyrophoric. To eliminate this property, the pigments, prior to their use in the pigment preparations according to the invention, can be surface-modified, oxidized, or passivated in a defined manner by treating them with gas/vapor mixtures.

Suitable coloring pigments for the preparations according to the invention include pigments such as TiN having an overall particle size of less than 500 nm (preferably of less than 150 nm, more preferably between 2 nm and 50 nm). Exemplary extinction coefficient values, for example, for TiN nanoparticles of diameter 10 nm, are 15 $l*g^{-1}*cm^{-1}$ at λ 440 nm and 65 $l*g^{-1}*cm^{-1}$ at λ 760 nm. For nanoparticles of diameter 100 nm, these values are 12 $l*g^{-1}*cm^{-1}$ at λ 450 nm and 50 $l*g^{-1}*cm^{-1}$ at λ 800 nm.

ZrN has properties similar to those of TiN. Compared with TiN, the resonance wavelength, and thus the absorption maximum, are at shorter wavelengths in the green region, giving a purple color effect in dilute dispersions. Similarly to TiN, ZrN, nanoparticles are suitable as a coloring pigment having an overall particle size of less than 300 nm (preferably less than 100 nm, more preferably between 2 nm and 50 nm).

The pigment of component (a) is preferably used in an amount of 0.05 to 80% by weight (preferably 0.1 to 30% by weight, more preferably 0.5 to 20% by weight) relative to the pigment preparation.

Dispersant

Dispersants are understood to mean molecules having a weight average molecular weight of greater than 1000 to 500,000 g/mole (preferably greater than 1000 to 100,000 g/mole, more preferably greater than 1000 to 10,000, g/mole). The dispersants may be non-ionic, anionic, cationic, or amphoteric compounds.

Examples of non-ionic dispersants include alkoxylates, alkanolamides, esters, amine oxides and alkyl polyglycosides.

Other suitable non-ionic dispersants include reaction products of alkylene oxides with alkylatable compounds, such as, for example, fatty alcohols, fatty amines, fatty acids, phenols, alkylphenols, arylalkylphenols such as styrene/phenol condensation products, carboxamides, and resin acids. Examples of these are ethylene oxide adducts from the class of ethylene oxide reaction products with (a) saturated and/or unsaturated fatty alcohols having 6 to 20 carbon atoms or (b) alkylphenols having 4 to 12 carbon atoms in the alkyl radical or (c) saturated and/or unsaturated fatty amines having 14 to 20 carbon atoms or (d) saturated and/or unsaturated fatty acids having 14 to 20 carbon atoms or (e) hydrogenated and/or non-hydrogenated resin acids. Particularly suitable ethylene oxide adducts are the alkylatable compounds mentioned under (a) to (e) containing 5 to 120 mole (preferably 5 to 60 mole, more preferably 5 to 30 mole) of ethylene oxide.

Particular preference is given to non-ionic polymer dispersants.

Examples of polymer dispersants are understood to mean compounds listed in "Water-Soluble Synthetic Polymers: Properties and Behavior", Volumes I and II (Philip Molyneux, CRC Press, Fla. 1983/84).

Further examples of suitable polymer dispersants are water-soluble and water-emulsifiable compounds, for example, homopolymers and copolymers, graft polymers and copolymers, and random block copolymers. Examples of particularly preferred polymer dispersants are AB, BAB, and ABC block copolymers. In AB or BAB block copolymers, the A segment is a hydrophobic homopolymer or copolymer which ensures pigment bonding and the B block is a hydrophilic homopolymer or copolymer or a salt thereof which ensures dispersion of the pigment in the aqueous medium. Polymer dispersants of this type and their synthesis are disclosed, for example, in European Patent Applications 518,225 and 556,649.

Further examples of suitable polymer dispersants are poly(ethylene oxides), poly(propylene oxides), poly(oxymethylenes), poly(trimethylene oxides), poly(vinyl methyl ethers), polyethylenimines, poly(acrylic acids), polyarylamides, poly(methacrylic acids), polymethacrylamides, poly(N,N-dimethylacrylamides), poly(N-isopropylacrylamides), poly(N-acrylglycinamides), poly(N-methacrylglycinamides), poly(vinyl alcohols), poly(vinyl acetates), polyvinyl alcohol/polyvinyl acetate copolymers, polyvinylpyrrolidone, polyvinyloxazolidones and polyvinylmethyloxazolidones.

Natural polymer dispersants such as cellulose, starch, gelatin, or derivatives thereof are also of importance as polymer dispersants. Polymers based on amino acid units, such as polylysine, polyaspartic acid and the like, are particularly suitable.

Examples of anionic dispersants include alkyl sulfates, ether sulfates, ether carboxylates, phosphate esters, sulfosuccinates, sulfosuccinamates, paraffin sulfonates, olefin sulfonates, sarcosinates, isothionates, taurates and lignin-type compounds.

Particular preference is given to anionic polymer dispersants.

Particularly suitable anionic polymer dispersants are condensation products of aromatic sulfonic acids with formaldehyde, such as condensation products of formaldehyde with alkylnaphthalenesulfonic acids or of formaldehyde with naphthalenesulfonic acids and/or benzenesulfonic acids and condensation products of substituted or unsubstituted phenol with formaldehyde and sodium bisulfite.

Condensation products obtainable by reaction of naphthols with alkanols, addition reactions of alkylene oxide and at least partial conversion of the terminal hydroxl groups into sulfo groups or maleic, phthalic, or succinic monoesters are also suitable.

Other suitable dispersants are those from the group of sulfosuccinates and alkylbenzenesulfonates and sulfated alkoxylated fatty alcohols or salts thereof. Alkoxylated fatty alcohols are understood to mean, in particular, saturated or unsaturated $C_6$–$C_{22}$ fatty alcohols, in particular stearyl alcohol, containing 5 to 120 (preferably 5 to 60, more preferably 5 to 30) ethylene oxide units. Particular preference is given to a stearyl alcohol alkoxylated with 8 to 10 ethylene oxide units. The sulfated alkoxylated fatty alcohols are preferably present as a salt, in particular as an alkali metal salt or amine salt, preferably as a diethylamine salt.

Other examples of anionic polymer dispersants are the salts of poly(acrylic acids), poly(ethylenesulfonic acids), poly(styrenesulfonic acid), poly(methacrylic acids), and polyphosphoric acids.

Additional examples of anionic polymer dispersants include copolymers of acrylic monomers, which are listed by way of example in the following table and, upon combining the following monomers, result in random, alternating or graft copolymers:

| | |
|---|---|
| Acrylamide | Acrylic acid |
| Acrylamide | Acrylonitrile |
| Acrylic acid | N-Acrylglycinamide |
| Acrylic acid | Ethyl acrylate |
| Acrylic acid | Methyl acrylate |
| Acrylic acid | Methylenebutyrolactam |
| N-Acrylglycinamide | N-Isopropylacrylamide |
| Methacrylamide | Methacrylic acid |
| Methacrylic acid | Benzyl methacrylate |
| Methacrylic acid | Diphenylmethyl methacrylate |
| Methacrylic acid | Methyl methacrylate |
| Methacrylic acid | Styrene |

Other anionic polymer dispersants are styrene/maleic anhydride copolymers, copolymers thereof with the acrylic monomers mentioned above, and polyurethane-based polymers.

Other suitable polymers are graft polymers and graft copolymers in which anionic vinyl monomers have been grafted onto a polymer base. The polymers used as polymer base can be synthetic or natural protective colloids.

Also particularly suitable are lignosulfonates, for example, those obtained by the sulfite or kraft process. They are preferably products which have in part been hydrolyzed, oxidized, propoxylated, sulfonated, sulfomethylated, or disulfonated and fractionated by known methods, for example, according to molecular weight or degree of sulfonation. Mixtures of sulfite and kraft lignosulfonates also have good efficiency. Lignosulfonates having a weight average molecular weight of greater than 1000 to 100,000, an active lignosulfonate content of at least 80% and, preferably, a low polyvalent cation content are highly suitable. The degree of sulfonation may vary over a wide range.

Examples of cationic dispersants include quaternary alkylammonium compounds and imidazoles.

Particular preference is given to cationic polymer dispersants.

Examples of cationic polymer dispersants are the salts of polyethylenimines, polyvinylamines, poly(2-vinylpyridines), poly(4-vinylpyridines), poly(diallyldimethylammonium chloride), poly(4-vinylbenzyltrimethylammonium salts), and poly(2-vinylpiperidine).

Examples of amphoteric dispersants include betaines, glycinates, propionates, and imidazolines.

Anionic and cationic polymers, which are grouped together as polyelectrolytes, are capable of dissociating completely or in part in an aqueous and/or organic phase.

The invention furthermore provides pigment preparations containing (a) at least one pigment from the group comprising carbides, nitrides, borides and sulicides of the elements Ti, Zr, Hf, Si, Ge, and Sn having an average primary particle size of 0.1 to 50 nm, and (b) at least one dispersant having a weight average molecular weight $M_w$ of less than or equal to 1000 and selected from the group of anionic dispersants comprising sulfosuccinic esters, alkylbenzenesulfonates, sulfated alkoxylated fatty alcohols or salts thereof, ether sulfates, ether carboxylates, phosphate esters, sulfosuccinamates, paraffin sulfonates, olefin sulfonates, sarcosinates, isothionates, taurates, lignin-type compounds, condensation products of aromatic sulfonic acids with formaldehyde, such as condensation products of formaldehyde and alkylnaphthalene-sulfonic acids or of formaldehyde, naphthalenesulfonic acids and/or benzenesulfonic acids, condensation products of substituted or unsubstituted phenol with formaldehyde and sodium bisulfite, and condensation products obtainable by reaction of naphthols with alkanols, addition reactions of alkylene oxide and at least partial conversion of the terminal hydroxyl groups into sulfo groups or maleic, phthalic, or succinic monoesters and polymers comprising amino acid units, in particular polylysine or polyaspartic acid, from the group of cationic dispersants, quaternary alkylammonium compounds and imidazoles, from the group of amphoteric dispersants comprising glycinates, propionates, and imidazolines, and from the group of non-ionic dispersants comprising alkoxylates, alkanolamides, esters, amine oxides, and alkyl polyglycosides and reaction products of alkylene oxides with alkylatable compounds, such as, for example, fatty alcohols, fatty amines, fatty acids, phenols, alkylphenols, arylalkylphenols, such as styrene/phenol condensation products, carboxamides and resin acids.

Examples of these dispersants are ethylene oxide adducts from the class of ethylene oxide reaction products with (a) saturated and/or unsaturated fatty alcohols having 6 to 20 carbon atoms or (b) alkylphenols having 4 to 12 carbon atoms in the alkyl radical or (c) saturated and/or unsaturated fatty amines having 14 to 20 carbon atoms or (d) saturated and/or unsaturated fatty acids having 14 to 20 carbon atoms or (e) hydrogenated and/or non-hydrogenated resin acids. Suitable ethylene oxide adducts are in particular the alkylatable compounds mentioned under (a) to (e) containing 5 to 120 mole (preferably 5 to 60, more preferably 5 to 30 mole) of ethylene oxide.

The dispersant used is preferably used in an amount of 0.1 to 200% by weight (preferably 0.5 to 100% by weight) relative to the sum of the pigments used.

Furthermore, the preparations according to the invention may contain organic solvents as component (d).

Suitable organic solvents (d) are aliphatic $C_1$–$C_4$ alcohols, such as methanol, ethanol, isopropanol, n-propanol, n-butanol, isobutanol, or tert-butanol, aliphatic ketones, such as acetone, methyl ethyl ketone, methyl isobutyl ketone or diacetone alcohol, polyols, such as ethylene glycol, propylene glycol, butylene glycol, diethylene glycol, triethylene glycol, trimethylolpropane, polyethylene glycol having an average molecular weight of 100 to 4000 g/mole (preferably 400 to 1500 g/mole), or glycerol, monohydroxy ethers, preferably monohydroxyalkyl ethers, particularly preferably glycol mono($C_1$–$C_4$ alkyl) ethers, such as ethylene glycol monoalkyl ether, ethylene glycol monomethyl ether, diethylene glycol monomethyl ether or diethylene glycol monoethyl ether, diethylene glycol monobutyl ether, dipropylene glycol monoethyl ether, thiodiglycol, triethylene glycol monomethyl ether or triethylene glycol monoethyl ether, 2-pyrrolidone, N-methyl-2-pyrrolidone, N-ethylpyrrolidone, N-vinylpyrrolidone, 1,3-dimethylimidazolidone, acetamides such as dimethylacetamide, and formamides such as dimethylformamide. Mixtures of the solvents mentioned above are also suitable.

The amount of organic solvent is preferably 1 to 40% by weight (more preferably 2 to 20% by weight) relative to the pigment preparations.

Preferably, the amount of water and of organic solvent is 20 to 99% by weight (more preferably 30 to 97% by weight) relative to the pigment preparations.

In addition to the dispersant used, the pigment preparations according to the invention, may contain further cationic, anionic, amphoteric, and/or non-ionic surface-active compounds, for example, those listed in "Surfactants Europa, A Directory of Surface-Active Agents available in Europe" (Edited by Gordon L. Hollis, Royal Society of Chemistry, Cambridge (1995)).

If the dispersant used contains an ionic group, these auxiliaries should preferably be non-ionic or have the same ionic character.

Other additives include compounds from the group of terpenes, terpenoids, fatty acids, and fatty acid esters. Of these, the preferred compounds are ocimene, myrcene, geraniol, nerol, linalool, citronellol, geranial, citronellal, neral, limonene, menthol, for example (–)-menthol, menthone, or bicyclic monoterpenes, saturated and unsaturated fatty acids having 6 to 22 carbon atoms, such as, for example, stearic acid, oleic acid, linolic acid, and linolenic acid, or mixtures thereof.

In a further preferred embodiment, the pigment preparations according to the invention contain, apart from a pigment of component (a) and a dispersant of component (b), further colorants of component (e). Examples of suitable colorants of this type are other organic and inorganic pigments and carbon black.

Particularly suitable carbon blacks are acid to alkaline carbon blacks from the group of furnace or gas carbon blacks and chemically or physically modified or after-treated carbon blacks, as well as inorganic pigments, such as, for example, zinc sulfides, ultramarine, iron oxides, cobalt blue, and chromium oxide pigments and pigments in the form of fine-particulate oxides, such as silicon dioxide, titanium dioxide, nickel oxides, alumina, and fine-particulate metals, such as copper, iron or aluminum, and organic coloring pigments, such as, for example, those from the azo, disazo, polyazo, anthraquinone, and thioindigo series, as well as other polycyclic pigments, such as, for example, those from the phthalocyanine, quinacridone, dioxazine, isoindolinone, naphthalenetetracarboxylic acid, and perylene and perylenetetracarboxylic acid series, and those from the perinone, indigoid, thioindigoid and diketopyrrolopyrrole series, and metal complex pigments of azo, azomethine or methine dyestuffs, or laked dyestuffs, such as Ca, Mg and Al lakes of dyestuffs containing sulfonic acid and/or carboxylic acid groups.

Other possible colorants include water-soluble organic dyestuffs or whitening agents, such as, for example, acid and basic dyestuffs or water-insoluble dyestuffs, such as, for example, disperse dyestuffs. Examples of disperse dyestuffs include those from the azo, disazo, anthraquinone, coumarin, isoindolenine, quinoline, and methine series.

Preferably, these additional colorants of component (e) are used in an amount of 0 to 80% by weight (more preferably 0 to 65% by weight), relative to the preparation. When colorants are additionally present in the pigment preparations, it is advantageous to keep the pigment (a) portion at a low level. Even at a ratio of colorant (e) to pigment (a) of as little as 0.05 to 10 (preferably 0.2 to 5), the advantageous properties, particularly the improved lightfastness compared with customary ink-jet inks not containing component (a), are considerably better.

Particularly preferred colorants in this context are carbon blacks and black water-soluble dyestuffs and the ones disclosed in European Patent Application 356,980 (particularly Examples 1 and 2) and in U.S. Pat. No. 4,963,189.

Accordingly, the invention also provides pigment preparations containing at least one pigment of component (a), at least one dispersant, preferably those of component (b) described above, water and a colorant (e) other than component (a) from the group comprising organic and inorganic pigments and carbon black.

Furthermore, when used as printing ink for ink-jet printing, for example, the pigment preparation may contain agents for adjusting the viscosity of the ink, such as, for example, poly(vinyl alcohol), polyvinylpyrrolidone, methylcellulose, and other agents known to those skilled in the art as long as they have no adverse effect on the stability of the printing ink, the printing performance, and the drying performance on paper.

The pigment preparations may also contain additives such as preservatives (biocides), further wetting agents or surfactants, spacers, matting agents, stabilizers, further UV absorbers, plasticizers, lubricating agents, and, if desired, pH controllers. Examples of suitable biocides are isothiazolones and benzoiso-thiazolones.

Suitable spacers or matting agents have average particle diameters, particularly in the 0.2 μm to 30 μm range, and are described, for example, in German patent 3,331,542.

The spacers are preferably water-insoluble and resistant to the solvent additives used in the inks. Examples of suitable spacers or matting agents are poly(methyl methacrylate), polystyrene, styrene/divinylbenzene copolymer, crosslinked poly(methyl methacrylate), and crosslinked or uncrosslinked polyvinyltoluene.

Suitable stabilizers are o-, m- and p-dihydroxybenzenes, hydroxychromans, 5-hydroxycoumarans, spirochromans, spiroindans, p-alkoxyphenols, sterically hindered phenols, gallic acid derivatives, methylenedioxybenzenes, aminophenols, aminoanilines, sterically hindered amines, derivatives containing esterified or etherified phenolic hydroxyl groups or derivatives containing acylated or alkylated aromatic amino groups, and metal complexes.

Particularly suitable stabilizers are sterically hindered amines, preferably compounds based on 2,2,6,6-tetraalkylpiperidine, particularly compounds based on 2,2,6,6,-tetraalkylpiperidine containing at least one covalently bonded 2,2,6,6-tetraalkylpiperidine fragment.

In many cases, it has proven particularly effective to use specific combinations of colored image stabilizers.

Suitable UV absorbers are described, for example, in German Application 19,503,885.

Plasticizers and lubricating agents are used, for example, for core/shell latices comprising a soft core and a hard shell, latices consisting of a soft core and a crosslinked gelatin shell and those containing soft intermediate layers.

Examples of pH controllers are NaOH, ammonia, or aminomethylpropanol, and N,N-dimethylaminoethanol.

Examples of preservatives are methyl- and chloromethyl-3-isothiazolinone, 3-benzoisothiazolinone, or mixtures thereof.

A further specific embodiment of the invention are the pigment preparations according to the invention additionally containing, apart from components (a) and (b) and, where appropriate, components (c) and (d), sterically hindered amines, preferably those based on 2,2,6,6-tetraalkylpiperidine, particularly those based on 2,2,6,6-tetraalkylpiperidine containing at least one covalently bonded 2,2,6,6-tetraalkylpiperidine fragment.

Preferred pigment preparations according to the invention contain (a) 0.05 to 80% by weight (preferably 0.1 to 30% by weight, more preferably 0.5 to 20% by weight) of at least one pigment of component (a) relative to the pigment preparation, (b) 0.1 to 200% by weight (preferably 0.5 to 100% by weight) of the dispersant of component (b) relative to the amount used of the pigment of (a), (c) 10 to 98% by weight (preferably 30 to 98% by weight) of water relative to the pigment preparation, and (d) 0 to 40% by weight (preferably 1 to 40% by weight, more preferably 2 to 20% by weight) of at least one organic solvent relative to the pigment preparation.

In a preferred composition, component (a) is TiN, ZrN, TiC, or SiC, particularly TiN or TiC as jet-black coloring pigment.

The invention further relates to preparing pigment preparations for use in printing inks for ink-jet printing by homogenizing the pigment of component (a) in nanocrystalline form together with any optional colorant (e), at least a portion of dispersant (b), and, if desired, with further additives and optionally subjecting the resultant mixture to dry or wet crushing.

Preparation of the pigment preparations according to the invention optionally includes a surface modification of pigments of component (a) in water and/or a polar organic solvent in order to convert the "crude pigments" obtained in the pigment preparation process to the desired finely divided form and to deagglomerate or deaggregate them. The methods for achieving this are described, for example, in European Patent Application 650,945 A2.

An alternative method of deagglomerating pigments of component (a) involves subjecting the pigment powders to a pre-treatment with dilute up to half-concentrated ammonia solution. However, pre-treatment of the pigments of component (a) can also take place in concentrated ammonia by heating to reflux, followed by drying at temperatures of 50 to 250° C.

Another possible method of pre-treating the pigments of component (a) is to mill them together with at least a portion of the polymer dispersant (b), for example, on a two-roll mill.

Pigment preparations according to the invention containing component (a) and pigment preparations containing pigments or, for example, water-insoluble colorants of component (e) can first be prepared separately on their own and then be mixed to give the desired pigment preparation.

In general, the pigment (i.e., component (a)), which can if desired be used after surface modification, and any optional water-insoluble colorants (i.e., pigments (e)) in powder form or as water-moist presscake and a portion of the dispersant and water (preferably deionized water) are introduced and homogenized in a stirred vat, dissolver, or similar device, if desired after preliminary crushing, until a homogeneous milled suspension is obtained.

The milled suspension may also contain portions of low-boiling solvents (boiling point greater than 150° C.) which can be eliminated during the course of the subsequent fine milling by evaporation. However, the milled suspension may also contain portions of higher-boiling solvents or further additives, such as described above, for example, milling aids, antifoaming agents, or wetting agents.

Wet crushing of component (a) or, if desired, components (e) or components (a) and (e) together includes not only preliminary crushing but also fine milling. During this operation, the pigment concentration of the suspension should preferably be above the desired concentration of the finished pigment preparation or printing ink. The pigment concentration is preferably adjusted to the desired final value following the wet crushing operation. Preliminary crushing is followed by milling to give the desired fine dispersion of the particles. Suitable devices for this milling are, for example, kneaders, roll mills, screw-type kneaders, ball mills, rotor/stator mills, dissolvers, corundum disc mills, vibrating mills, and, preferably, high-speed continuously or batchwise charged stirred ball mills containing a milling medium 0.1 to 5 mm in diameter. The milling medium can be made of glass, ceramic, or metal (for example, steel). The milling temperature is preferably in the range from 0 to 250° C., but is usually room temperature, and is preferably below the cloud point of the dispersant of component (b) and of the optionally used surface-active agent.

In a similarly preferred operating procedure, milling can take place in part or completely in a high-pressure homogenizer or in a jet homogenizer (disclosed in German application 19,536,845), as a result of which the amount of milling medium abrasion in the suspension or the release of soluble substances from the milling medium (for example, ions from glass beads) can be minimized or completely avoided.

In a dilution step, the pigment preparation obtained is mixed in water in a known manner with any remaining amounts of dispersant and, if desired, further additives, and the resulting mixture is homogenized and brought to the desired final pigment concentration and color strength of the preparation or printing ink. During this step, it may be desirable to add another portion of dispersant, for example, to avoid reagglomeration of the fine pigment particles in the dilution.

Of particular advantage is a process for preparing the pigment preparations in which, in order to achieve stabilization, sufficient amounts of dispersant are provided in the milling step for preparing the pigment concentrate. Following this step or after dilution with water, any dispersant present in solution and not adsorbed on the pigment and/or any excess surface-active agents are preferably removed, followed by standardizing the pigment preparation to the desired strength by adding the remaining portions of the pigment preparation.

One method of removing dispersant present in solution involves, for example, centrifuging the suspension and then decanting the supernatant. Membrane or microfiltration methods are also suitable.

Furthermore, other additives, such as polyurethane or acrylic polymers, can be added, if desired, to improve the water fastness even further. These additives may be of the water-soluble or water-emulsifiable type or may be soluble in one of the components present in (d).

In a preferred operating procedure, mixing and homogenization of the pigment preparations take place by means of a jet homogenizer or high-pressure homogenizer so as to prevent foam from being formed and to avoid possible reagglomeration.

Standardization of the pigment preparations to the desired strength takes place simultaneously with the adjustment to the desired viscosity, color strength, shade, density, and surface tension of the ink.

Before using the pigment preparations as printing inks, the inks are, if necessary, filtered through a fine filter using, for example, 0.5 to 5 μm membrane or glass filters.

In general, the physical characteristics of the inks are adjusted for use in customary ink-jet printers, in which the surface tension should preferably be 20 to 70 mN/m and the viscosity should preferably be less than 20 mPa.s (preferably 0.5 to 10 mPa.s).

Printing inks used according to the invention and printing inks according to the invention, when used as printing ink in ink-jet printing, produce prints exhibiting excellent light-fastness and high optical density and also possess the following advantages: excellent dispersion and storage stability over a wide temperature range; no clogging (cogation) in the printing head; high water and migration fastness of the prints on different substrates, for example, on wood-free paper, medium-grade paper, sized, and coated paper, polymer films, and transparencies for overhead projection; and no bleeding in polychrome printing, even when used jointly with dyestuff inks or other pigmented inks.

The pigment preparations described above are used, for example, as printing inks for ink-jet printing.

The invention further relates to a process for coating substrates with aqueous pigment preparations containing at least one pigment from the group comprising carbides, nitrides, borides, and silicides of the elements Ti, Zr, Hf, Si, Ge, and Sn having an average primary particle size of 0.1 to 50 nm using the ink-jet method.

These aqueous pigment preparations preferably contain a dispersant, particularly one as described above. Preferred ingredients and amounts used are those given above. Preferred substrates are the ones described above and below.

Ink-jet printing or the ink-jet method is known and is usually carried out by filling the reservoir of an ink-jet printing head with printing ink and spraying the ink onto the substrate in small droplets. The ink discharge in droplet form preferably takes place via a piezoelectric crystal, a heated needle (bubble- or thermo-jet method), or a mechanical pressure increase whereby pressure is applied to the ink system, resulting in ejection of ink droplets. Ejected from one or more small nozzles, the droplets are made to impinge selectively on the substrate, such as, for example, paper, wood, textiles, plastic, or metal. Using an electronic control system, the individual droplets are combined on the substrate to give graphic characters or patterns. In an alternative method, an ink jet is delivered in minute volumes in the form of droplets to a substrate using electrostatic deflection.

The following examples further illustrate details for the preparation and use of the compositions of this invention. Unless otherwise noted, all temperatures are degrees Celsius and all percentages are percentages by weight.

EXAMPLES

Example 1

1.2 g of polyaspartic acid (molecular weight 3000 g/mole) were dissolved in 64 ml of deionized water. 16 g of solid TiN (prepared by the CVR method in a primary particle size distribution of 0.5 to 30 nm) were then added to this solution in portions with vigorous mixing (magnetic stirrer). The pH was brought to 3.0 to 3.5 with nitric acid, and the suspension was treated with ultrasound (power: 200 watts) for 5 minutes. The suspension was then filtered off with suction through a cellulose acetate/cellulose nitrate round filter having a pore size of 0.45 nm (model HAWP® from Millipore) into a sintered-glass crucible and the filter cake was dried at 70° C. in a drying cabinet for 10 hours.

10 g of the TiN powder thus modified were taken up in 50 ml of a solution of 100 g of PEG 1000 (polyethylene glycol of $M_w$ 1000 g/mole), 50 g of 2-pyrrolidone, 6 g of an alkyl glycoside, and 844 g of deionized water, and the pH was brought to 6 with half-concentrated $NH_3$ solution. This was followed by treating the suspension with an ultrasonic finger for 5 minutes.

To determine the particle characteristics of the suspension, an aliquot was diluted with the above-mentioned solution and the average particle diameter of TiN was determined by the dynamic light scattering method (scattered light distribution). A value of 122 nm was found.

The ultracentrifuge method (weight distribution) gave the following values for the weight distribution:

| $d_{10}$ | $d_{50}$ | $d_{90}$ |
|---|---|---|
| 46 nm | 72 nm | 107 nm |

(where $d_{10}$ indicates that 10% by weight of all particles do not exceed 46 nm, $d_{50}$ indicates that 50% by weight of all particles do not exceed 72 nm and $d_{90}$ indicates that 90% by weight of all particles do not exceed 107 nm. As used in this context, particles are understood to mean both primary particles and aggregates or agglomerates).

No particles having a particle size above 500 nm were found.

Example 2

1.2 g of polyacrylic acid (molecular weight 90,000) were dissolved in 64 ml of deionized water. 16 g of solid TiN (prepared by the CVR method in a primary particle size distribution of 0.5 to 30 nm) were then added to this solution in portions with vigorous mixing (magnetic stirrer). The pH was brought to 3.0 to 3.5 with nitric acid, and the suspension was treated with ultrasound (power: 200 watts) for 5 minutes. The suspension was then filtered with suction through a cellulose acetate/cellulose nitrate round filter having a pore size of 0.45 nm into a sintered-glass crucible and the filter cake was dried at 70° C. in a drying cabinet for 10 hours.

10 g of the TiN powder thus modified were taken up in 50 ml of a solution of 100 g of PEG 1000 (polyethylene glycol of $M_w$ 1000 g/mole), 50 g of 2-pyrrolidone, 6 g of an alkyl glycoside as in Example 1, and 844 g of deionized water, and the pH was brought to 6 with half-concentrated $NH_3$ solution. This was followed by treating the suspension with an ultrasonic finger for 5 minutes.

To determine the particle characteristics of the suspension, an aliquot was diluted with the above-mentioned solution, and the average particle diameter was determined by the dynamic light scattering method (scattered light distribution). A value of 131 nm was found.

The ultracentrifuge method (weight distribution) gave the following values for the weight distribution of the particles:

| $d_{10}$ | $d_{50}$ | $d_{90}$ |
|---|---|---|
| 53 nm | 107 nm | 224 nm |

No particles having a particle size above 500 nm were found.

The TiN dispersions prepared in accordance with Examples 1 and 2 were used to fill a commercial black cartridge of a Hewlett-Packard printer HP 560C. Prints on Agfa standard paper, HP special paper, and HP transparencies were made. The printing nozzles showed no clogging over an extended period of time. In all tests, jet-black prints having high optical density and excellent water and marker fastness could be obtained.

Although the invention has been described in detail in the foregoing for the purpose or illustration, it is to be understood that such detail is solely for that purpose and that variations can be made therein by those skilled in the art without departing from the spirit and scope of the invention except as it may be limited by the claims.

What is claimed is:

1. A pigment preparation comprising
   (a) at least one pigment having an average primary particle size of 0.1 to 50 nm selected from the group consisting of carbides, nitrides, borides, and silicides of the elements Ti, Zr, Hf, Si, Ge, and Sn,
   (b) at least one dispersant having a weight average molecular weight ($M_w$) greater than 1000, and
   (c) water.

2. A pigment preparation according to claim 1 wherein the pigment of component (a) is present as primary particles, agglomerates, aggregates, and/or as a mixture thereof, said agglomerates and aggregates having an average particle size of less than 500 nm.

3. A pigment preparation according to claim 1 wherein the pigment of component (a) is ZrN, TiN, TiC, and/or SiC.

4. A pigment preparation according to claim 1 wherein the dispersants of component (b) are water-soluble or water-emulsifiable homopolymers or copolymers, graft polymers or copolymers, random block copolymers, poly(ethylene oxides), poly(propylene oxides), poly(oxymethylenes), poly(trimethylene oxides), poly(vinyl methyl ethers), polyethylenimines, poly(acrylic acids), polyarylamides, poly(methacrylic acids), polymethacrylamides, poly(N,N-dimethylacrylamides), poly(N-isopropylacrylamides), poly(N-acrylglycinamides), poly(N-methacrylglycinamides), poly(vinyl alcohols), poly(vinyl acetates), polyvinyl alcohol/polyvinyl acetate copolymers, polyvinylpyrrolidone, polyvinyloxazolidones, polyvinylmethyloxazolidones, cellulose or derivatives thereof, starch or derivatives thereof, gelatin or derivatives thereof, or polymers based on amino acid units.

5. A pigment preparation according to claim 1 wherein the dispersants of component (b) are anionic condensation products of aromatic sulfonic acids with formaldehyde, condensation products of substituted or unsubstituted phenol with formaldehyde and sodium bisulfite, sulfosuccinates, alkylbenzenesulfonates, sulfated alkoxylated fatty alcohols, products obtained by reaction of naphthols with alkanols or alkylene oxide wherein at least a portion of the terminal hydroxyl groups are replaced by sulfo groups, maleic monoesters, phthalic monoesters, succinic monoesters, or salts thereof.

6. A pigment preparation comprising
 (a) at least one pigment having an average primary particle size of 0.1 to 50 nm selected from the group consisting of carbides, nitrides, borides, and silicides of the elements Ti, Zr, Hf, Si, Ge, and Sn,
 (b) at least one dispersant having an average molecular weight $M_w$ less than or equal to 1000 selected from the group consisting of anionic sulfosuccinic esters, alkylbenzene-sulfonates, sulfated alkoxylated fatty alcohols or salts thereof, ether sulfates, ether carboxylates, phosphate esters, sulfosuccinamates, paraffin sulfonates, olefin sulfonates, sarcosinates, isothionates, taurates, lignin-type compounds, condensation products of aromatic sulfonic acids with formaldehyde, condensation products of substituted or unsubstituted phenol with formaldehyde and sodium bisulfite, and products obtained by reaction of naphthols with alkanols or alkylene oxide wherein at least a portion of the terminal hydroxyl groups are replaced by sulfo groups, maleic monoesters, phthalic monoesters, succinic monoesters, and polymers based on amino acid units, cationic quaternary alkylammonium compounds and imidazoles, amphoteric glycinates, propionates, and imidazolines, and non-ionic dispersants alkoxylates, alkanolamides, esters, amine oxides, alkyl polyglycosides, and reaction products of alkylene oxides with alkylatable compounds.

7. A pigment preparation according to claim 1 additionally comprising at least one organic solvent selected from the group consisting of aliphatic $C_1$–$C_4$ alcohols, aliphatic ketones, polyols, monohydroxy ethers, pyrrolidones, imidazolidones, acetamides, formamides, and mixtures thereof.

8. A pigment preparation according to claim 1 additionally comprising at least one organic solvent selected from the group consisting of methanol, ethanol, isopropanol, n-propanol, n-butanol, isobutanol, tert-butanol, acetone, methyl ethyl ketone, methyl isobutyl ketone, diacetone alcohol, ethylene glycol, propylene glycol, butylene glycol, diethylene glycol, triethylene glycol, trimethylolpropane, polyethylene glycol having an average molecular weight of 100 to 4000, glycerol, ethylene glycol monoalkyl ether, ethylene glycol monomethyl ether, diethylene glycol monomethyl ether, diethylene glycol monoethyl ether, diethylene glycol monobutyl ether, dipropylene glycol monoethyl ether, thiodiglycol, triethylene glycol monomethyl ether, triethylene glycol monoethyl ether, 2-pyrrolidone, N-methyl-2-pyrrolidone, N-ethylpyrrolidone, and N-vinylpyrrolidone, 1,3-dimethylimidazolidone, dimethylacetamide and dimethylformamide, and mixtures thereof.

9. A pigment preparation according to claim 1 additionally comprising a colorant selected from the group consisting of organic pigments, inorganic pigments, carbon black, water-insoluble dyestuffs, and water-soluble dyestuffs.

10. A pigment preparation according claim 1 comprising
 (a) 0.05 to 80% by weight, relative to the total amount of the pigment preparation, of pigment (a),
 (b) 0.1 to 200% by weight, relative to the amount of pigment (a), of dispersant (b),
 (c) 10 to 98% by weight, relative to the total amount of the pigment preparation, of water, and
 (d) 0 to 40% by weight, relative to the total amount of the pigment preparation, of the organic solvent.

11. A pigment preparation according to claim 1 additionally comprising a sterically hindered amine.

12. A pigment preparation according to claim 11 wherein the sterically hindered amine containing at least one covalently bonded 2,2,6,6-tetraalkylpiperidine fragment.

13. A pigment preparation comprising
 (a) at least one pigment selected from the group consisting of carbides, nitrides, borides, and silicides of the elements Ti, Zr, Hf, Si, Ge, and Sn and having an average primary particle size of 0.1 to 50 nm,
 (b) at least one dispersant,
 (c) water, and
 (e) at least one colorant other than component (a) selected from the group consisting of organic pigments, inorganic pigments, and carbon black.

14. A process for coating substrates with an aqueous pigment preparation comprising spraying the aqueous pigment preparation onto a substrate in small droplets wherein the aqueous pigment preparation comprises at least one pigment having an average primary particle size of 0.1 to 50 nm selected from the group consisting of carbides, nitrides, borides, and silicides of the elements Ti, Zr, Hf, Si, Ge, and Sn.

15. A method for ink-jet printing comprising applying droplets of an aqueous pigment preparation according to claim 1 to a substrate.

* * * * *